(12) United States Patent
Bauer et al.

(10) Patent No.: US 6,262,831 B1
(45) Date of Patent: Jul. 17, 2001

(54) POWER SUPPLY FOR ELECTROCHROMIC MIRRORS IN HIGH VOLTAGE AUTOMOTIVE POWER SYSTEMS

(75) Inventors: Frederick T. Bauer; Robert R. Turnbull; William L. Tonar, all of Holland; Jeffrey A. Forgette, Jenison; John S. Anderson, Holland; Jon H. Bechtel, Holland; John W. Carter, Holland; Joseph S. Stam, Holland, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/426,794

(22) Filed: Oct. 22, 1999

(51) Int. Cl.[7] ............................................ G02B 1/15
(52) U.S. Cl. ...................... 359/265; 359/264; 359/267; 359/602
(58) Field of Search ................................. 359/265, 264, 359/266, 267, 603, 604, 884, 601, 602

(56) References Cited

U.S. PATENT DOCUMENTS

| | | | |
|---|---|---|---|
| 4,860,185 | * 8/1989 | Brewer et al. | 363/41 |
| 5,475,366 | * 12/1995 | Van Lente et al. | 340/525 |
| 5,671,996 | * 9/1997 | Bos et al. | 362/83.1 |
| 5,675,438 | 10/1997 | Nagao et al. | 359/603 |
| 5,878,353 | * 3/1999 | ul Azam et al. | 455/550 |
| 6,056,410 | 5/2000 | Hoekstra et al. . | |
| 6,089,721 | * 7/2000 | Schierbeck | 359/603 |
| 6,140,808 | * 10/2000 | Massie | 323/284 |
| 6,166,698 | 12/2000 | Turnbull et al. . | |

OTHER PUBLICATIONS

Robinson, Aaron "Ford Exec: Get Set for 42 Volts," *Automotive News*, Aug. 16, 1999.
"DC–to–DC Converter Control Circuits," Motorola, Inc. 1996.
"TNY256 TinySwitch™ Plus Energy Efficient, Low Power Off–Line Switcher," Power Integrations, Inc., Aug. 1999.
Pages from SMPS Technology Knowledge Base, "Chaos in Power Electronics" (4 pages), and "Chaos–Timeline of Papers" (2 pages), Sep. 13, 1999.

* cited by examiner

*Primary Examiner*—Georgia Epps
*Assistant Examiner*—Tim Thompson
(74) *Attorney, Agent, or Firm*—Price, Heneveld, Cooper, DeWitt & Litton

(57) ABSTRACT

A rearview mirror assembly is disclosed including a housing adapted to be mounted to the vehicle, a mirror disposed in the housing, at least one electrically powered device disposed in the housing, and a power supply for receiving power from a vehicle power source having a voltage in excess of about 24 V and for supplying power at a voltage of about 5 V or less to the electrically powered device. The electrically powered device and the power supply exhibit an electromagnetic interference level of less than about 41 dB$\mu$V/m for emissions in the frequency range from about 0.4 MHz to about 20 MHz. The mirror is preferably an electrochromic mirror, and the electrically powered device may be a control circuit for the electrochromic mirror.

50 Claims, 8 Drawing Sheets

POWER SUPPLY FOR ELECTROCHROMIC MIRRORS IN HIGH VOLTAGE AUTOMOTIVE POWER SYSTEMS

BACKGROUND OF THE INVENTION

The present invention generally relates to power supplies for vehicle accessories, and more particularly pertains to a power supply for use in supplying power to an electrochromic mirror.

Automotive power systems are migrating from 12 V in cars and 24 V in some trucks towards higher voltages such as 42 V to reduce wiring weight and provide more electrical power for systems such as electric power steering and heat pumps. Electrochromic mirrors are driven with low voltages at relatively high currents. When using a linear series regulated power supply in a 12 V system, the power dissipation in the mirror can be in the range of 4 to 5 W (350 mA load). Using the same design approach with a 42 V supply would result in a 15 W power dissipation. A power dissipation of 5 W is in itself fairly difficult to handle in a small object such as a rearview mirror. A 15 W power dissipation presents a serious problem. Some mirrors, such as those that include displays or even dual displays (see, for example, commonly assigned U.S. patent application Ser. No. 09/359,616), can draw in excess of 500 mA and present an even larger and greater challenge with respect to thermal dissipation.

While voltage converters are generally known that could conceivably be utilized to convert a 42 V supply to lower, more practical voltages, such switched power supplies generate significant levels of electromagnetic interference (EMI). The rearview mirror is in a particularly critical location due to its proximity to the vehicle's radio antenna and the lack of a ground plane. To reduce cost, rearview mirrors are typically placed in plastic housings, which provide little EMI shielding. Thus, using such a switched power supply in a rearview mirror would result in EMI levels that greatly exceed the maximum levels accepted by manufacturers.

SUMMARY OF THE INVENTION

It is an aspect of the present invention to provide a rearview mirror assembly that can receive power from a power supply source of the vehicle having a voltage in excess of 24 V while exhibiting EMI levels within acceptable limits for a rearview mirror. To achieve these and other aspects and advantages, a rearview mirror assembly of the present invention comprises a housing adapted to be mounted in the vehicle, a mirror disposed in the housing, at least one electrically powered device disposed in the housing, and a power supply for receiving power from a vehicle power source having a voltage in excess of about 24 V and supplying power at a voltage of about 5 V or less to the electrically powered device. The electrically powered device and the power supply exhibit an electromagnetic interference level less than about 41 dB$\mu$V/m for emissions in the frequency range from about 0.4 MHz to about 20 MHz. The mirror may be an electrochromic mirror, while the electrically powered device may be a control circuit for the electrochromic mirror. The electrically powered device may also, or alternatively, be one or more of the following: a display device, map lights, outside electrochromic rearview mirrors, an electronic compass circuit, a GPS receiver, a trainable transceiver, and a cellular telephone transceiver.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
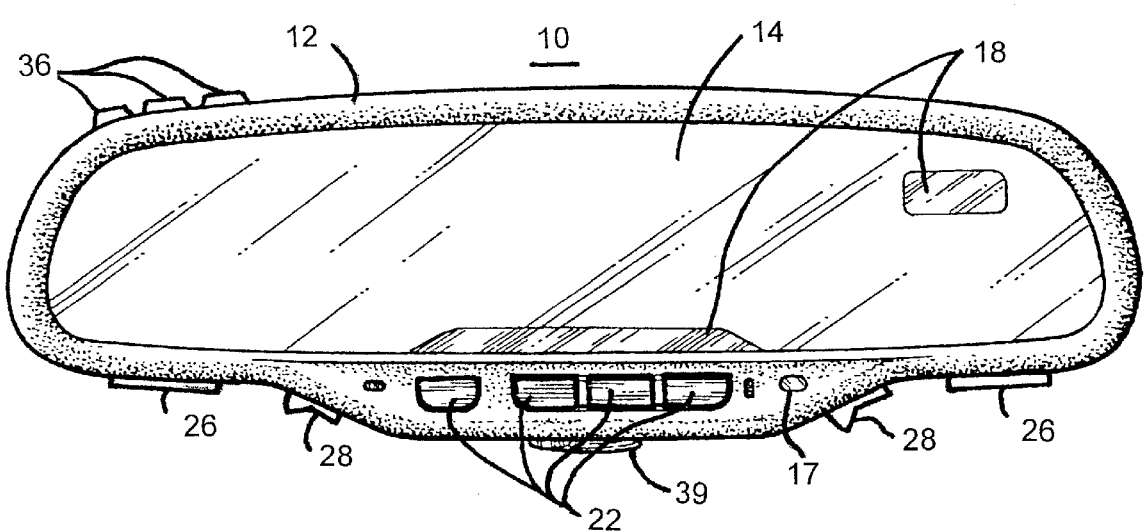
FIG. 1 is a front perspective view of a rearview mirror assembly constructed in accordance with the present invention.
Figure 2:
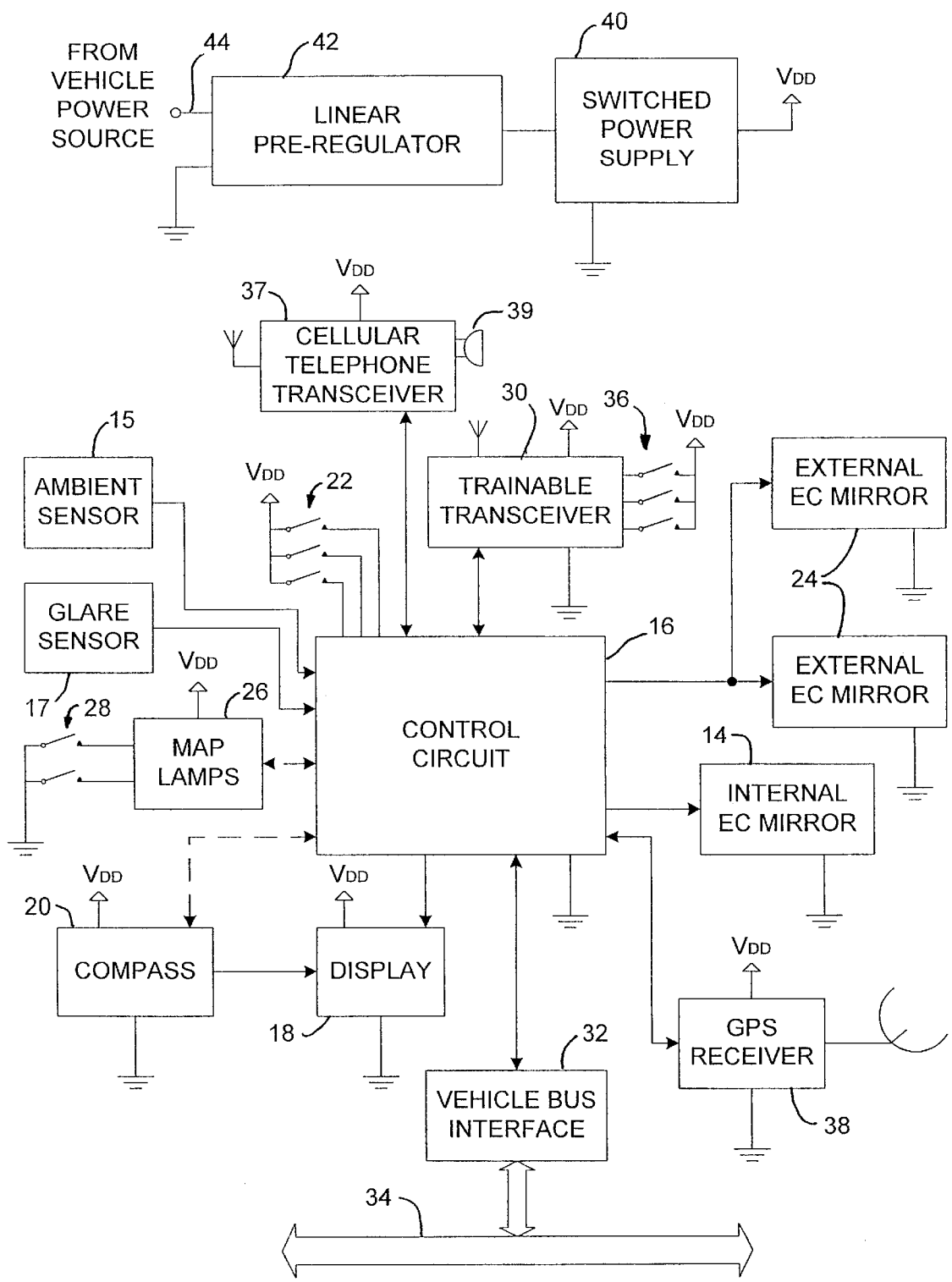
FIG. 2 is an electrical circuit diagram in block and schematic form illustrating an electrical circuit that may be implemented in a rearview mirror in accordance with aspects of the present invention.

A rearview mirror assembly 10 constructed in accordance with the present invention is shown in FIG. 1. As illustrated, rearview mirror assembly 10 includes a housing or bezel 12. Mirror assembly 10 further includes a mirror element 14, which is preferably an electrochromic mirror having a reflectivity that is automatically and electronically controlled by a control circuit that responds to light levels sensed by an ambient light sensor 15 and a glare sensor 17 (FIG. 2). As illustrated in FIG. 2, a control circuit 16 is provided within mirror assembly 10 to process outputs from sensors 15 and 17 and to adjust a voltage level between 1.2 and 0 V, for example, that is applied to the internal electrochromic mirror 14. If the vehicle is equipped with external electrochromic mirrors 24, control circuit 16 may also apply a selected voltage level on a line coupled to external electrochromic mirrors 24. A preferred construction by which control circuit 16 may be electrically coupled to external electrochromic mirrors 24 is disclosed in commonly assigned U.S. patent application Ser. No. 09/368,325, entitled VEHICLE COMMUNICATION SYSTEM, filed by Robert C. Knapp et al. on Aug. 3, 1999, the disclosure of which is incorporated herein by reference.

Referring to FIGS. 1 and 2, mirror assembly 10 may also include one or more displays 18 that are mounted behind mirror element 14 so as to display information to the vehicle occupants. Such displays are typically mounted behind certain regions of the mirror element where the reflective material of the mirror element has been removed to provide a transparent non-reflective window. Preferably, however, if displays are utilized in the rearview mirror assembly, mirror element 14 is constructed with a transflective layer as disclosed in commonly assigned U.S. patent application Ser. No. 09/311,955, entitled ELECTROCHROMIC REARVIEW MIRROR INCORPORATING A THIRD SURFACE METAL REFLECTOR AND A DISPLAY/SIGNAL LIGHT, filed by William L. Tonar et al. on May 14, 1999, the disclosure of which is incorporated herein by reference.

Display(s) 18 may be used to display information, such as external temperature and/or vehicle heading, as determined by an electronic compass 20 that may also be mounted inside housing 12. The display(s) 18 may also be used to display various other information, such as instruction codes for a trainable transceiver 30, time of day, the text from a paging signal, tire pressure, telephone numbers, or any other information that would commonly be conveyed to the vehicle occupants, such as the information conveyed by a vehicle trip computer. Display 18 may be configured as a dual display as disclosed in commonly assigned U.S. patent application Ser. No. 09/359,616, entitled LOW EMI MULTIPLEXED DUAL DISPLAY, filed by Robert R. Turnbull on Jul. 22, 1999, the disclosure of which is incorporated herein by reference.

Rearview mirror assembly 10 may further include a plurality of user-activated switches 22 that enable a vehicle occupant to input commands to control circuit 16 that may be used to control the information that is displayed on display(s) 18, to turn on or off or otherwise adjust the electrochromic mirror, or to control any other electronic device that is disposed within housing 12 or otherwise electrically coupled to control circuit 16.

As shown in FIGS. 1 and 2, mirror assembly 10 may also include map lamps 26 disposed on a bottom surface of housing 12 along with associated switches 28 that allow a vehicle occupant to selectively turn map lamps 26 on and off. Map lamps 26 may also be turned on and off via control circuit 16 when, for example, the vehicle doors are opened or an interior light switch on the instrument panel is activated. Control circuit 16 may receive information that doors have been opened or that an interior light switch has been activated via a vehicle bus interface 32 that is coupled to an electrical bus system of the vehicle. Map lamps 26 are preferably constructed using bi-complementary colored light-emitting diodes (LEDs) as disclosed in commonly assigned U.S. Pat. No. 5,803,579, entitled ILLUMINATOR ASSEMBLY INCORPORATING LIGHT EMITTING DIODES, filed by Robert R. Turnbull et al. on Jun. 13, 1996, the disclosure of which is incorporated herein by reference. While the bi-complementary colored LEDs are preferred, it will be appreciated that other LEDs may be used such as phosphor LEDs, as well as incandescent bulbs and the like.

If a trainable transceiver 30 is disposed within housing 12 or otherwise electrically coupled to control circuit 16, mirror assembly 10 may also include a plurality of additional user-activated switches 36 that may be manipulated to selectively transmit an associated RF signal to a garage door opener receiver or to an electronic control system remote from the vehicle. Trainable transceiver 30 may also be utilized to receive remote keyless entry (RKE) signals, in which case trainable transceiver 30 may apply RKE detection signals to an input of control circuit 16, whereby control circuit 16 would convey one or more signals through bus interface 32 over vehicle bus 34 to which the door locks would respond by locking or unlocking and to which an alarm system may respond by becoming activated or deactivated. Also, lights within the vehicle, such as map lamps 26, may additionally respond to this signal so as to turn on or off the lights within or outside of the vehicle.

As also shown in FIG. 2, a GPS receiver 38 may be mounted in rearview mirror housing 12 and coupled to control circuit 16. The information obtained from GPS receiver 38 may be utilized in a variety of manners as disclosed in commonly assigned U.S. Pat. No. 6,166,698, entitled REARVIEW MIRROR WITH INTEGRATED MICROWAVE RECEIVER, filed by Robert R. Turnbull et al. on Feb. 16, 1999, the disclosure of which is incorporated herein by reference.

A cellular telephone transceiver 37 may also be provided in housing 12 or otherwise coupled to control circuit 16. Cellular transceiver 37 may form part of a vehicle communication system, such as the On-Star® system now available on many General Motors vehicles. A microphone 39 may be mounted on housing 12 and coupled to cellular transceiver 37 to facilitate hands-free communication using transceiver 37.

To enable the electronic circuitry such as that shown in FIG. 2 to operate using power supplied from a vehicle power source having a voltage in excess of 24 V, a switched power supply 40 is provided to convert the voltage of the received power to a voltage VDD of about 5 V or less for use by the various electrically powered devices provided in rearview mirror assembly 10. A linear pre-regulator 42 may optionally be coupled between the vehicle power source line and switched power supply 40 in order to block transients appearing in the supplied power. Linear pre-regulator 42 may also be used to reduce the voltage appearing on the power source supply line 44 prior to its application to switched power supply 40. Thus, for example, if the vehicle power source is a 42 V source, linear pre-regulator 42 may be used to reduce the voltage applied to switched power supply to 40 V, thereby enabling the use of a power supply 40 that is rated at a lower voltage than that supplied from the vehicle power source. Switched power supply 40 and linear pre-regulator 42 may be disposed within housing 12 or optionally may be disposed in any other location within the vehicle.

Figure 3:
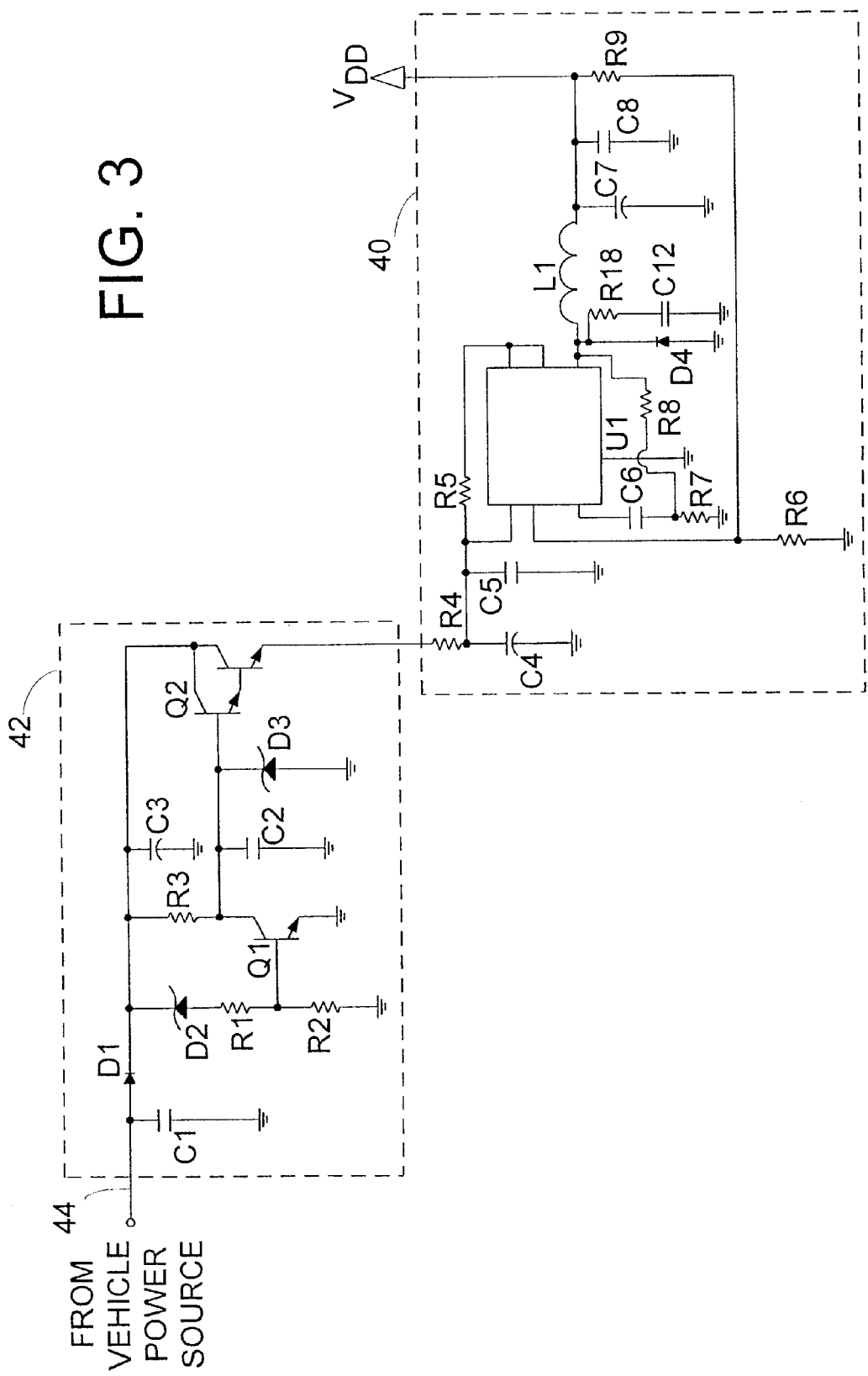
FIG. 3 is an electrical circuit diagram in block and schematic form illustrating a linear pre-regulator and switched power supply that may be utilized to implement the present invention.
Figure 4:
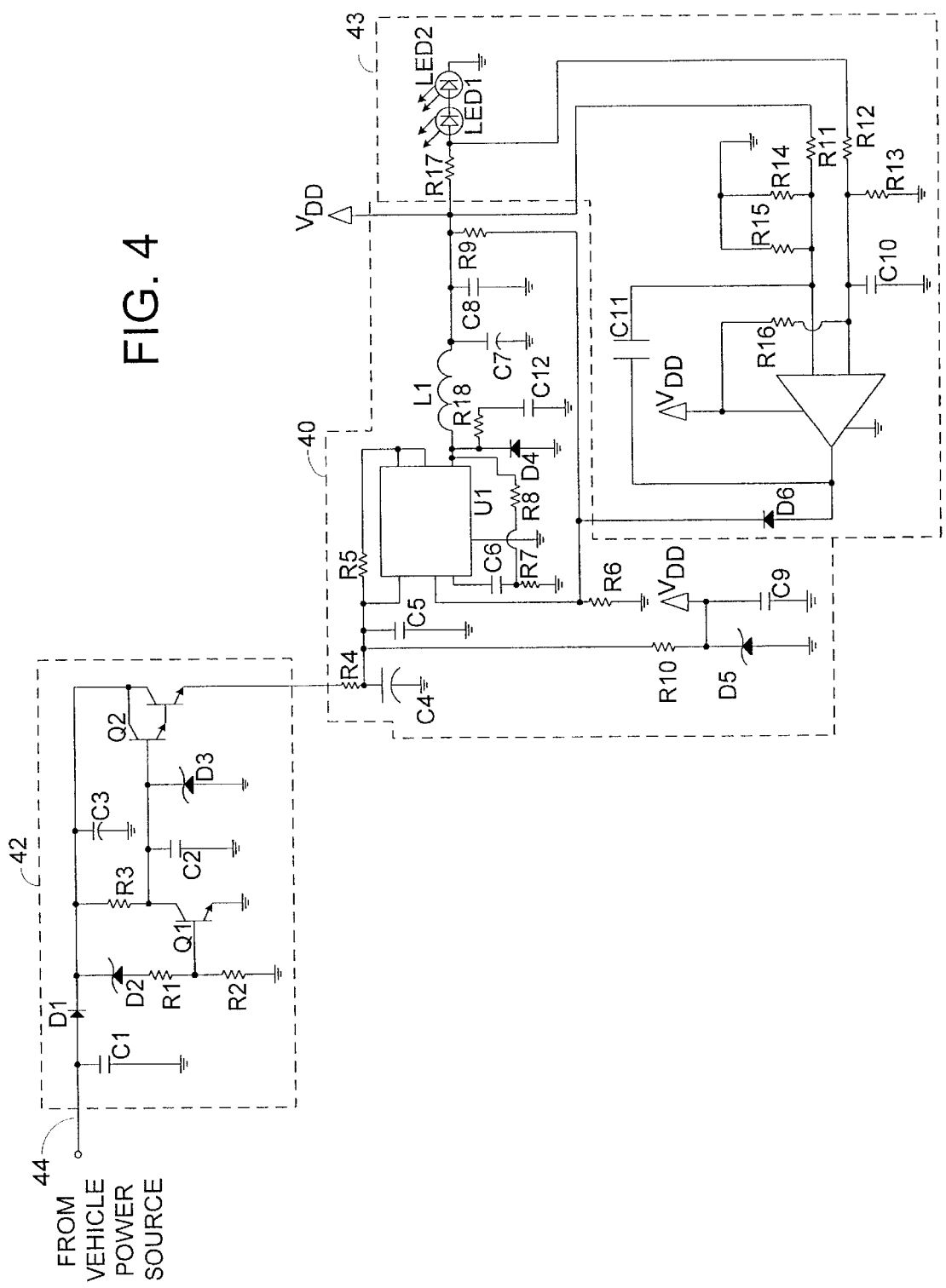
FIG. 4 is a linear pre-regulator, switched power supply, and map lamp driver circuit that may be utilized to implement the present invention in a rearview mirror assembly.

Exemplary constructions for linear pre-regulator and switched power supply 40 are illustrated in FIGS. 3 and 4. As illustrated in FIGS. 3 and 4, linear pre-regulator 42 includes the following components: capacitors C1=0.01 $\mu$F, C2=0.01 $\mu$F, and C3=22 $\mu$F; diode D1, D2, and D3; transistors Q1 and Q2; and resistors R1=3.9 k$\Omega$, R2=1 k$\Omega$, and R3=3.9 k$\Omega$. It will be appreciated that linear pre-regulator 42 may have constructions different from those shown in FIGS. 3 and 4.

Switched power supply 40 preferably includes: capacitors C4=22 $\mu$F, C5=0.1 $\mu$F, C6=470 pF, C7=100 $\mu$F, and C8=0.1 $\mu$F; inductor L1=100 $\mu$H; a diode D4; resistors R5=0.33$\Omega$, R6=1 k$\Omega$, R7=100$\Omega$, R8=2.2 k$\Omega$, and R9=3.01 k$\Omega$; and a DC-to-DC converter control integrated circuit U1, such as Motorola Part No. MC34063A. As illustrated in FIG. 4, switched power supply 40 may also include a capacitor C9=0.1 $\mu$F, a resistor R10=2.2 k$\Omega$, and a 6.2V zener diode D5.

A snubber circuit consisting of resistor R18=470$\Omega$ and a capacitor C12=2200 pF may be coupled to an output of DC-to-DC converter control integrated circuit U1. The snubber circuit is provided to minimize ringing at pin 2 of circuit U1 and to reduce the edge rate on pin 2.

With the construction shown in FIGS. 3 and 4, switched power supply 40 may receive power from any vehicle power source having voltages between about 42 V and 5 V, and convert that voltage to a voltage of 5 V or less for use for the electrically powered devices shown in FIG. 2. Switched power supply 40 does not need to be reconfigured or redesigned when used with different vehicle power sources having different voltages. Thus, the construction shown in FIGS. 3 and 4 offers the advantage that a rearview mirror assembly may be constructed with switched power supply 40 and optionally linear pre-regulator 42 provided in its housing, such that the mirror assembly may be mounted in any vehicle regardless of the voltage of its power source.

As shown in FIG. 4, the voltage $V_{DD}$ output from switched power supply 40 may be used to directly power the LEDs of map lamps 26. An appropriate lamp driving circuit 43 is shown in FIG. 4, which includes: capacitors C10=0.1 $\mu$F and C11=0.1 $\mu$F; diode D6; operational amplifier U2; resistors R11=10 k$\Omega$, R12=10 k$\Omega$, R13=10 k$\Omega$, R14=10 k$\Omega$, R15=210 k$\Omega$, R16=210 k$\Omega$, and R17=0.75$\Omega$.

Figure 5:
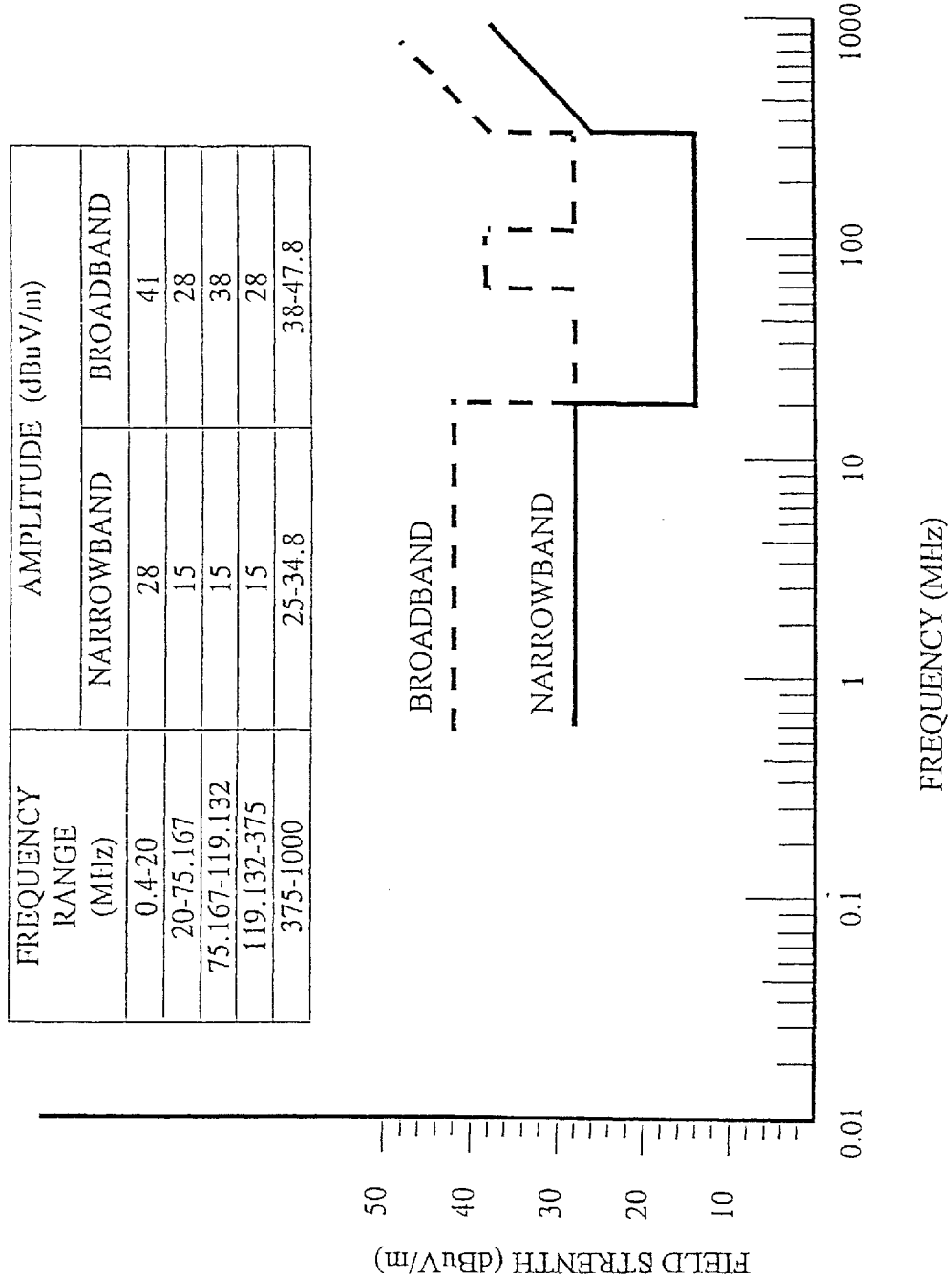
FIG. 5 is a graph illustrating currently acceptable EMI levels for both narrowband and broadband emissions.

FIG. 5 graphically illustrates currently acceptable EMI levels for both narrowband and broadband emissions. In this context, broadband refers to a bandwidth which is greater than that of the receiver that is used to measure emissions. Conversely, narrowband refers to a bandwidth that is less than that of the receiver that is used to measure emissions. A typical EMI measurement receiver has a bandwidth of approximately 10 kHz. A typical broadband emission source includes ignition systems and brush-type DC motors. A narrowband emission source includes microprocessors, clocks, pulse width modulated motor drivers and light dimmers, and switched power supplies.

As illustrated in FIG. 5, from 0.4–20 MHz, narrowband emissions are limited to 28 dB$\mu$V/m, and broadband emissions are limited to 41 dB$\mu$V/m. From 20–75.167 MHz, narrowband emissions should not exceed 15 dB$\mu$V/m, and the broadband emissions should not exceed 28 dB$\mu$V/m. From 75.167–119.132 MHz, narrowband emissions are limited to 15 dB$\mu$V/m, and broadband emissions are limited to 38 dB$\mu$V/m. From 119.132–375 MHz, narrowband emissions should not exceed 15 dB$\mu$V/m, and broadband emissions should not exceed 28 dB$\mu$V/m. In the range of 375–1000 MHz, narrowband and broadband limitations are approximately linear.

At 375 MHz, narrowband emissions should not exceed 25 dB$\mu$V/m and at 1000 MHz, narrowband emissions should not exceed 34.8 dB$\mu$V/m. At 375 MHz, broadband emissions should not exceed 38 dB$\mu$V/m and at 1000 MHz, broadband emissions should not exceed 47.8 dB$\mu$V/m. Of particular interest in this case is the frequency range from 0.4–20 MHz. As previously stated, in this frequency range, narrowband emissions should be less than about 28 dB$\mu$V/m and broadband emissions should be less than about 41 dB$\mu$V/m.

Figure 6:
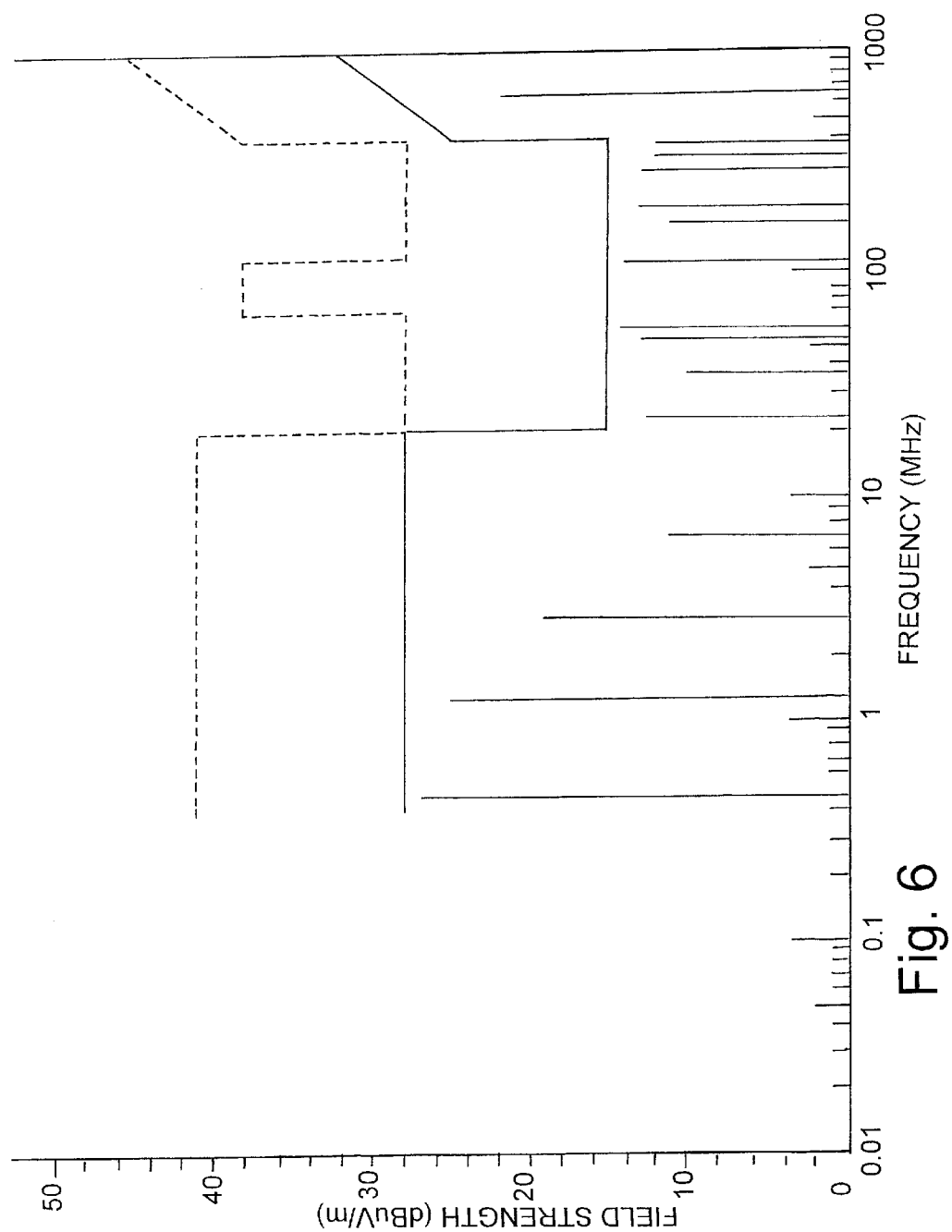
FIG. 6 is a plot of a typical narrowband EMI emission spectrum.

FIG. 6 illustrates a typical narrowband emission spectrum. The illustrated narrowband emission spectrum is within the narrowband emission limits of FIG. 5. As stated above, a typical narrowband emission source includes microprocessors, clocks, pulse width modulated motor drivers and light dimmers, and switched power supplies. The narrowband emission spectrum of FIG. 6 is provided for illustration only and is not intended to be limiting. One skilled in the art will appreciate that narrowband emission spectrum depend on the characteristics of a given circuit or device.

Figure 7:
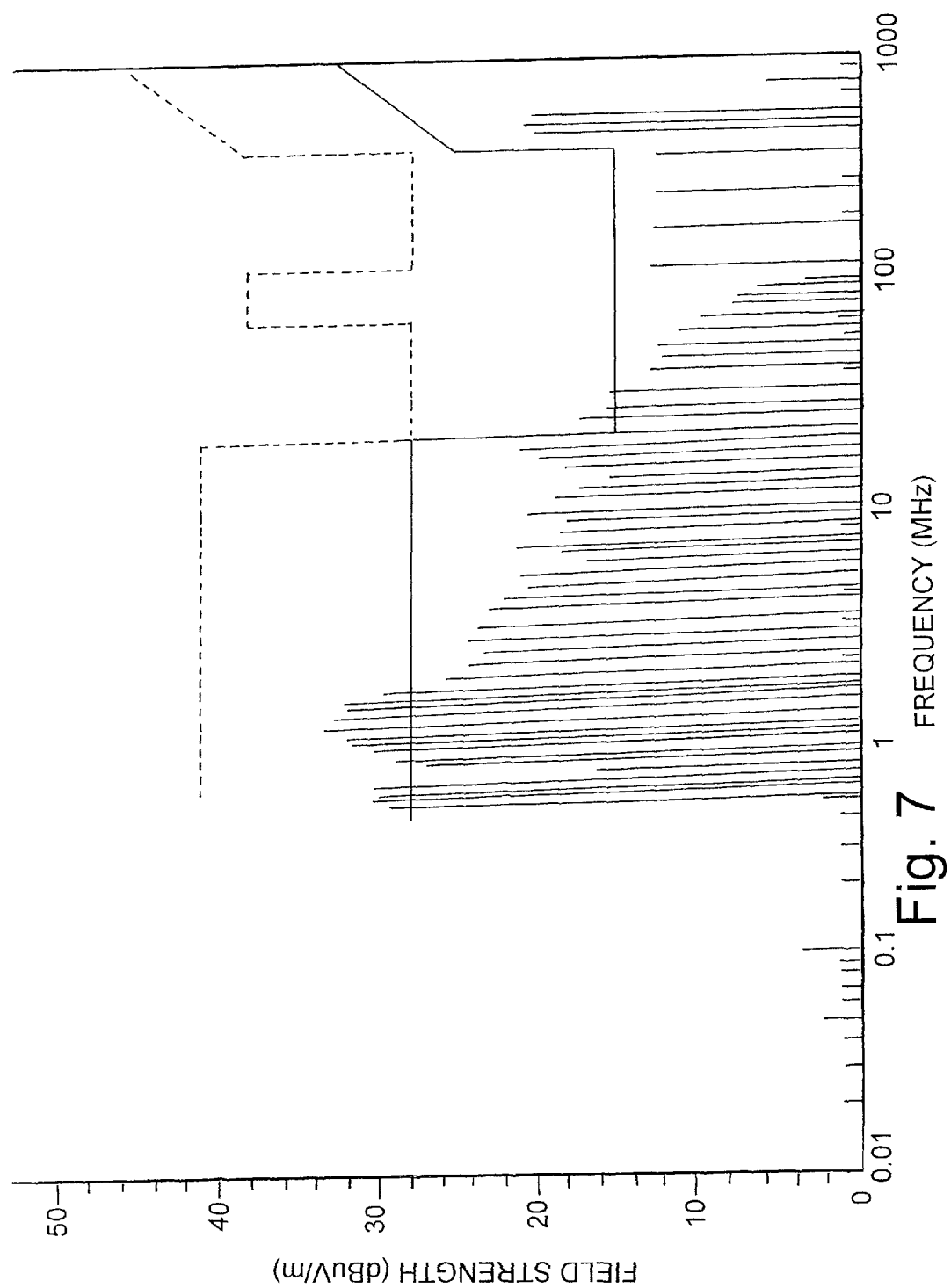
FIG. 7 is a plot of a typical broadband EMI emission spectrum.

FIG. 7 graphically depicts a typical broadband emission spectrum. The broadband emission spectrum of FIG. 7 is within the broadband emission limits as set forth in FIG. 5. As previously stated, a typical broadband emission source includes ignition systems and brush-type DC motors. The illustrated broadband emission spectrum is only provided as an example and is not intended to be limiting. One skilled in the art will appreciate that broadband emission spectrums also depend on the characteristics of a given circuit or device.

The use of a conventional switched power supply would cause the EMI levels for the rearview mirror assembly to exceed acceptable levels. Specifically, a conventional switched power supply would generally emit narrowband emissions that would exceed the levels shown in FIGS. 5–7. To overcome this problem, a chaotic signal is summed into the timing ramp generator of DC-DC converter control circuit U1 to spread out the EMI narrowband spectrum.

In this case, the chaotic signal is generated by the inductor-capacitor-diode network in the buck stage of the power supply. The one shot in the PDM generator of the DC-DC converter control circuit U1 also contributes non-linearity, hence chaos, to the system. The introduction of the chaotic signal introduces frequency dithering to the output of switched power supply 40, and thus the EMI emissions are broadband rather than narrowband, which are subject to less stringent broadband EMI specifications.

Figure 8:
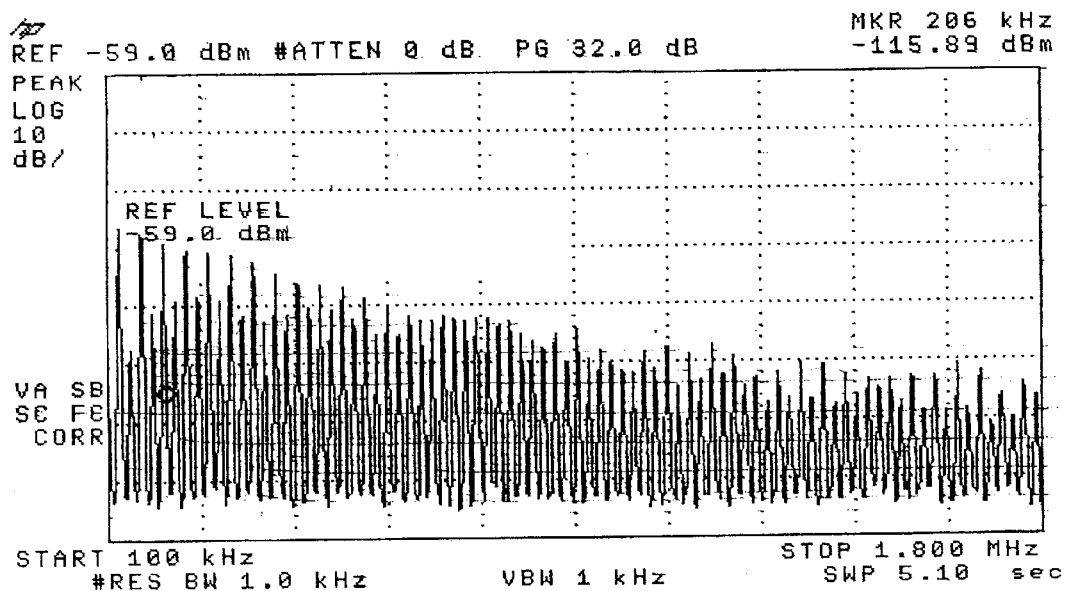
FIG. 8 is a plot of the EMI spectrum exhibited by a rearview mirror assembly utilizing a switched power supply.
Figure 9:
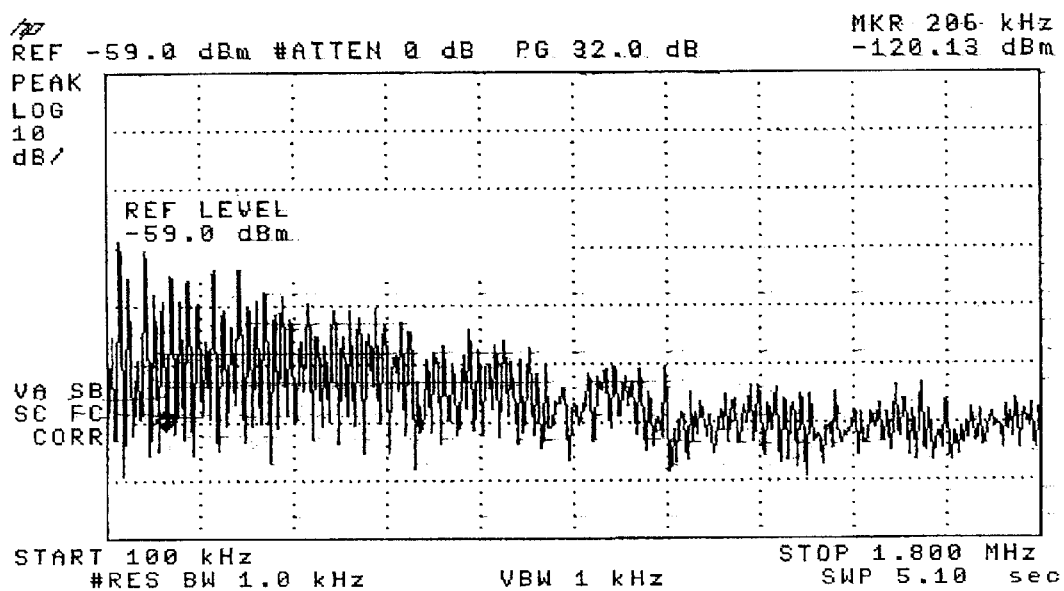
FIG. 9 is a plot of the EMI spectrum exhibited by a rearview mirror assembly utilizing a switched power supply with frequency dithering.

Broadband EMI in an AM broadcast band is less objectionable as it has a "white noise" or "static" sound rather than strong beat notes or tones that are present when narrow band EMI emissions are present. FIG. 8 shows the EMI emissions of a switched power supply having an input voltage of 9.8 V, where a chaotic signal is not introduced to control circuit U1, while the plot shown in FIG. 9 shows the EMI emissions when the chaotic signal is applied.

To reduce costs, the windings of the magnetic components in switched power supply 40 can be incorporated into the printed wiring board on which the control circuit and some of the other electrically powered components are mounted. When a switched power supply is utilized, the circuit board housed within housing 12 may be more compact as less heat sink area is required. In addition to generating less heat, the compactness of the circuit board allows the weight of the mirror to be reduced, which reduces vibration of the mirror. The compaction of the circuit board may also allow extra features to be incorporated in the additional available space within housing 12. Further, incandescent map lamp life may be improved with low voltage operation in high vibration environments.

Although specific topologies are shown and described for linear pre-regulator 42 and switched power supply 40, it will be appreciated by those skilled in the art that other topologies may be used. For example, Buck, Flyback, SEPIC, Boost, Cuk, or push-pull center-tapped transformers may be used. Additionally, quasi-resonant and resonant versions of the same topologies are also possible. In general, a switched mode power supply is preferred for reducing power dissipation in an automatic dimming mirror by converting the 12–48 V input to a lower voltage, such as 3.3 V or 5 V. Such a mirror can operate from either 12 V or 42 V electrical systems, reducing the need to provide different models for vehicles with different electrical system voltages. Electric vehicles may have even higher system voltages (320 V on the GM EV1). The circuitry described above is also applicable to 120/240 V AC systems after rectification and filtering (for building lighting).

Also, while the present invention has been described with respect to rearview mirror assemblies, it will be appreciated that other electrically powered vehicle components such as center high-mounted stop lights (CHMSL) assemblies, turn signal assemblies, brake lights, cargo lights, etc. would also benefit from voltage reduction via a switched power supply or a switched current source when used in vehicles with higher voltage electrical systems. CHMSL assemblies, turn signal assemblies, brake lights, and cargo lights constructed using LEDs are disclosed in commonly-assigned U.S. patent application Ser. No. 09/153,654, entitled "SYSTEMS AND COMPONENTS FOR ENHANCING REAR VISION FROM A VEHICLE," filed by Frederick T. Bauer et al. on Sep. 15, 1998, the entire disclosure of which is incorporated herein by reference. Electrically-powered components including LEDs will particularly benefit from the use of the switched power supply of the present invention. For instance, when a higher voltage vehicle power source is used, LEDs arranged in a series or series/parallel relation become inefficient with a substantial voltage mismatch with waste heat going into the ballast. By using a switching current source such as that shown in FIG. 4, the voltage or current mismatch may be drastically reduced and the system power efficiency may be increased.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A rearview mirror assembly for a vehicle comprising:
a housing adapted to be mounted to the vehicle;
an electrochromic mirror disposed in said housing;
a control circuit for controlling the electrochromic mirror; and
a power supply for receiving power from a vehicle power source having a voltage in excess of about 24 V and supplying power at a voltage of about 5 V or less to said control circuit, said control circuit and said power supply exhibiting an electromagnetic interference level less than about 41 dB$\mu$V/m for emissions in the frequency range from about 0.4 MHz to about 20 MHz.

2. The mirror assembly of claim 1, wherein the electromagnetic interference level exhibited by said control circuit and said power supply is less than about 28 dB$\mu$V/m for narrowband emissions in the frequency range from about 0.4 MHz to about 20 MHz.

3. The mirror assembly of claim 1, wherein said power supply receives power from a vehicle power source having a voltage in excess of about 30 volts.

4. The mirror assembly of claim 1, wherein said power supply receives power from a vehicle power source having a voltage in excess of about 40 volts.

5. The mirror assembly of claim 1, wherein said power supply is a switched power supply.

6. The mirror assembly of claim 1 and further including circuitry for dithering the pulse width or the switching frequency of said power supply.

7. The mirror assembly of claim 1 and further including a linear pre-regulator circuit coupled between the vehicle power source and said power supply for reducing transients in the power received from the vehicle power source.

8. The mirror assembly of claim 1, wherein said power supply is mounted in said housing.

9. The mirror assembly of claim 1, wherein said control circuit is mounted in said housing.

10. The mirror assembly of claim 1, wherein said housing is adapted to be mounted to the interior of the vehicle such that said mirror assembly functions as an inside rearview mirror assembly.

11. The mirror assembly of claim 1, wherein said housing is adapted to be mounted to the exterior of the vehicle such that said mirror assembly functions as an outside rearview mirror assembly.

12. A method for providing power to an electrochromic rearview mirror assembly from a vehicle power source having a voltage in excess of about 24 volts while producing an electromagnetic interference level less than about 41 dB$\mu$V/m for emissions in the frequency range from about 0.4 MHz to about 20 MHz, the method comprising:

(a) providing a switched power supply to convert the voltage of the power received from the vehicle power source to about 5 volts or less;

(b) dithering of the frequency of the power supplied from the power supply; and (c) supplying the power to the electrochromic rearview mirror assembly.

13. The method of claim 12, wherein the electromagnetic interference level is less than about 28 dB$\mu$V/m for narrowband emissions in the frequency range from about 0.4 MHz to about 20 MHz.

14. An electrical control system for an electrochromic mirror of a vehicle comprising:
a linear pre-regulator circuit coupled to a vehicle power source for reducing transients in the power received from the vehicle power source;
a switched power supply coupled to an output of said linear pre-regulator circuit for reducing the voltage of the power supplied from the vehicle power source; and
a control circuit coupled to said switched power supply to receive the reduced voltage power output from said switched power supply, said control circuit controls the reflectance of the electrochromic mirror by varying the voltage applied to the electrochromic mirror; and
circuitry for dithering the pulse width or the switching frequency of said power supply.

15. The electrical control system of claim 14, wherein the vehicle power source has a voltage in excess of about 24 volts and said switched power supply reduces this voltage to supply power at a voltage of about 5 volts or less to said control circuit.

16. The electrical control system of claim 14, wherein the vehicle power source has a voltage in excess of about 30 volts and said switched power supply reduces this voltage to supply power at a voltage of about 5 volts or less to said control circuit.

17. The electrical control system of claim 14, wherein the vehicle power source has a voltage in excess of about 40 volts and said switched power supply reduces this voltage to supply power at a voltage of about 5 volts or less to said control circuit.

18. An electrical control system for an electrochromic mirror of a vehicle comprising:
a linear pre-regulator circuit coupled to a vehicle power source for reducing transients in the power received from the vehicle power source;
a switched power supply coupled to an output of said linear pre-regulator circuit for reducing the voltage of the power supplied from the vehicle power source; and
a control circuit coupled to said switched power supply to receive the reduced voltage power output from said switched power supply, said control circuit controls the reflectance of the electrochromic mirror by varying the voltage applied to the electrochromic mirror,
wherein said control circuit and said switched power supply exhibit an electromagnetic interference level less than about 41 dB$\mu$V/m for emissions in the frequency range from about 0.4 MHz to about 20 MHz.

19. The electrical control system of claim 18, wherein the electromagnetic interference level exhibited by said control circuit and said power supply is less than about 28 dB$\mu$V/m for narrowband emissions in the frequency range from about 0.4 MHz to about 20 MHz.

20. A rearview mirror assembly for a vehicle comprising:
a housing adapted to be mounted to the vehicle;
a mirror disposed in said housing;
at least one electrically powered device disposed in said housing; and
a power supply for receiving power from a vehicle power source having a voltage in excess of about 24 volts and supplying power at a voltage of about 5 volts or less to said electrically powered device, said electrically powered device and said power supply exhibiting an electromagnetic interference level less than about 41 dB$\mu$V/m for emissions in the frequency range from about 0.4 MHz to about 20 MHz.

21. The mirror assembly of claim 20, wherein the electromagnetic interference level exhibited by said electrically powered device and said power supply is less than about 28 dB$\mu$V/m for narrowband emissions in the frequency range from about 0.4 MHz to about 20 MHz.

22. The mirror assembly of claim 20, wherein said mirror is an electrochromic mirror.

23. The mirror assembly of claim 22, wherein said electrically powered device is a control circuit for said electrochromic mirror.

24. The mirror assembly of claim 23, wherein said at least one electrically powered device includes a display device disposed in said housing.

25. The mirror assembly of claim 24, wherein said at least one electrically powered device includes map lights disposed in said housing.

26. The mirror assembly of claim 25, wherein said at least one electrically powered device includes outside electrochromic rearview mirrors.

27. The mirror assembly of claim 23, wherein said at least one electrically powered device includes outside electrochromic rearview mirrors.

28. The mirror assembly of claim 20, wherein said at least one electrically powered device includes a display device disposed in said housing.

29. The mirror assembly of claim 20, wherein said at least one electrically powered device includes map lights disposed in said housing.

30. The mirror assembly of claim 20, wherein said at least one electrically powered device includes an electronic compass circuit disposed in said housing.

31. The mirror assembly of claim 20, wherein said at least one electrically powered device includes a GPS receiver disposed in said housing.

32. The mirror assembly of claim 20, wherein said at least one electrically powered device includes a trainable transmitter disposed in said housing.

33. The mirror assembly of claim 20, wherein said at least one electrically powered device includes a microphone disposed on said housing.

34. An electrically powered vehicle component comprising:
at least one electrically powered device; and
a power supply for receiving power from a vehicle power source having a voltage in excess of about 24 volts and supplying power at a voltage of about 5 volts or less to said electrically powered device, said electrically powered device and said power supply exhibiting an electromagnetic interference level less than about 41 dB$\mu$V/m for emissions in the frequency range from about 0.4 MHz to about 20 MHz.

35. The electrically powered vehicle component of claim 34, wherein said at least one electrically powered device includes at least one light-emitting diode.

36. The electrically powered vehicle component of claim 34, wherein said at least one electrically powered device includes a center high-mounted stop lamp.

37. The electrically powered vehicle component of claim 34, wherein said at least one electrically powered device includes a cargo light.

38. The electrically powered vehicle component of claim 34, wherein said at least one electrically powered device includes a turn signal indicator assembly.

39. The electrically powered vehicle component of claim 34 and further including a snubber circuit coupled to said power supply.

40. A lighting fixture for a vehicle comprising:
at least one light-emitting diode;
a switching current source for receiving power from a vehicle power source having a voltage in excess of about 24 volts and supplying power at a voltage of about 5 volts or less to said light emitting diode; and
a circuit for dithering the pulse width or the switching frequency of said switching current source.

41. A rearview mirror assembly for a vehicle comprising:
a housing adapted to be mounted to the vehicle;
a mirror disposed in said housing;
at least one electrically powered device disposed in said housing; and
a power supply for receiving power from a vehicle power source having a voltage in excess of about 24 V and supplying power at a voltage of about 5 V or less to said electrically powered device, wherein said electrically powered device and said power supply exhibit an electromagnetic interference level less than about 41 dB$\mu$V/m for emissions in the frequency range from about 0.4 MHz to about 20 MHz.

42. The rearview mirror assembly of claim 41, wherein said mirror is an electrochromic mirror and said at least one electrically powered device includes a control circuit for controlling said electrochromic mirror.

43. The rearview mirror assembly of claim 42, wherein said at least one electrically powered device includes a light source.

44. The rearview mirror assembly of claim 41, wherein said at least one electrically powered device includes a light source.

45. The rearview mirror assembly of claim 44, wherein said light source includes at least one light emitting diode.

46. The rearview mirror assembly of claim 41, wherein said at least one electrically powered device includes a display device.

47. The rearview mirror assembly of claim 41, wherein said at least one electrically powered device includes an electronic compass circuit disposed in said housing.

48. A rearview mirror assembly for a vehicle comprising:
a housing adapted to be mounted to the vehicle;
a mirror disposed in said housing;
at least one electrically powered device disposed in said housing; and
a power supply for receiving power from a vehicle power source having a voltage in excess of about 24 V and supplying power at a voltage of about 5 V or less to said electrically powered device;
wherein said at least one electrically powered device includes a GPS receiver disposed in said housing.

49. The rearview mirror assembly of claim 41, wherein said at least one electrically powered device includes a trainable transmitter disposed in said housing.

50. The rearview mirror assembly of claim 41, wherein said at least one electrically powered device includes a microphone disposed on said housing.

* * * * *